United States Patent [19]
Bennett

[11] 3,787,729
[45] Jan. 22, 1974

[54] SEQUENCING STEP CONTROL
[75] Inventor: Charles D. Bennett, Alderwood Manor, Wash.
[73] Assignee: Cam Industries, Inc., Kent, Wash.
[22] Filed: July 13, 1972
[21] Appl. No.: 271,622

[52] U.S. Cl. .................. 307/41, 307/117, 219/486
[51] Int. Cl. ............................................. H05b 1/02
[58] Field of Search ...... 307/41, 117; 219/480, 486, 219/483, 487

[56] References Cited
UNITED STATES PATENTS
3,496,337  2/1970  Vogelsonger ...................... 219/486
3,529,173  9/1970  Verma ................................. 307/41
3,586,869  6/1971  Kompelien .......................... 307/41
3,351,739  11/1967 Eckman .......................... 219/486 X
3,489,882  1/1970  Krackow ............................ 219/486

Primary Examiner—Herman J. Hohauser
Assistant Examiner—M. Ginsburg
Attorney, Agent, or Firm—Richard W. Seed et al.

[57] ABSTRACT

A control for varying loads such as heating elements in response to a change in an environmental variable such as temperature in which the first load to be energized is always the first load to be de-energized and the last load to be energized is always the last load to be de-energized.

4 Claims, 6 Drawing Figures

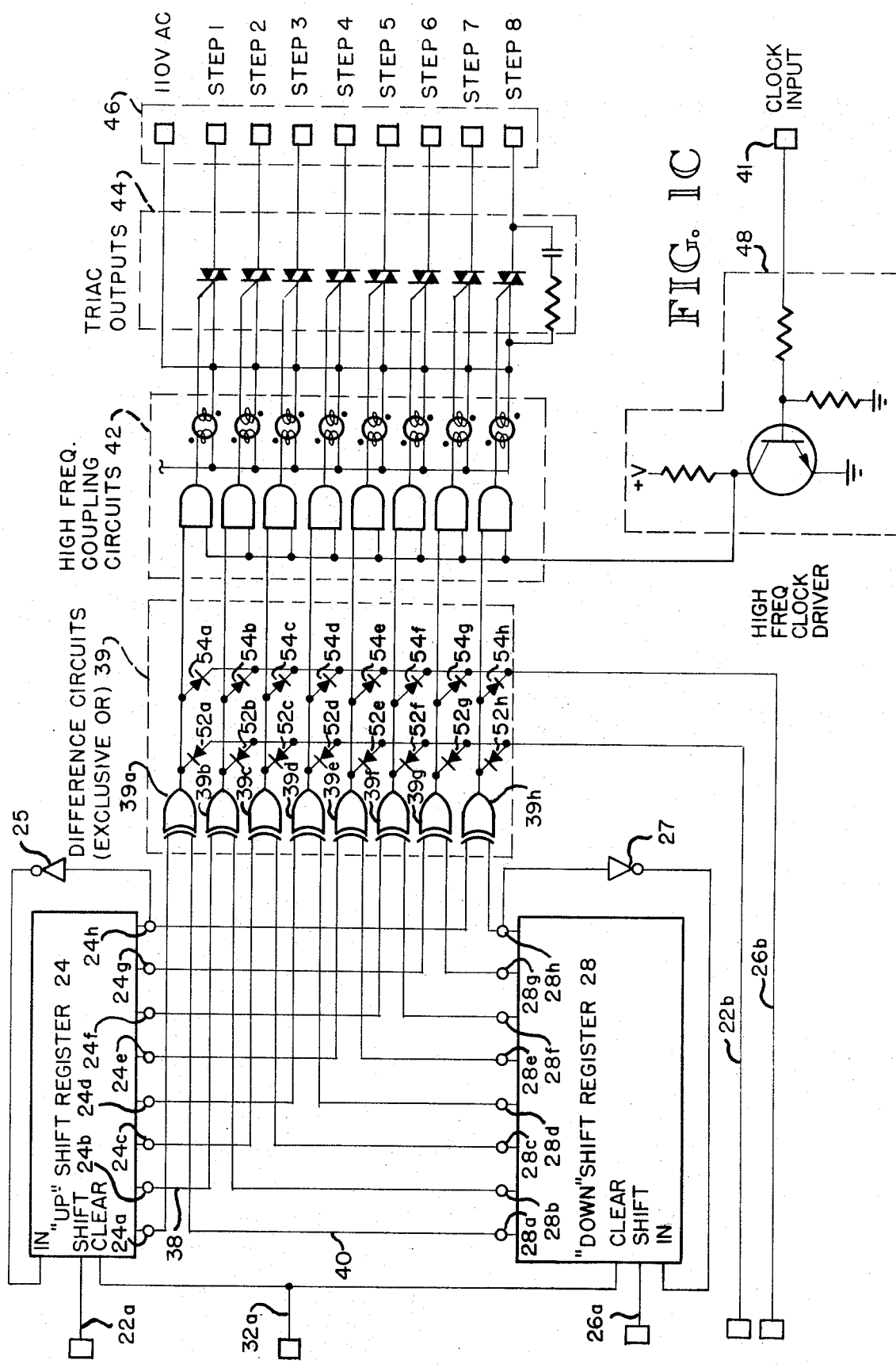

SEQUENCING STEP CONTROL

BACKGROUND OF THE INVENTION

1. Field of the Invention

This invention relates to the control of a plurality of loads in response to variations in one or more conditions to be controlled. Particularly the invention is related to selectively varying the order or sequence of energization and de-energization of the loads in response to the varying conditions.

2. Description of the Prior Art

Numerous types of controls have been heretofore employed to energize or de-energize a load or loads in response to a varying condition. Some of thses devices are electromechanical in operation, using some form of stepping switch which energizes the loads sequentially according to the demand indicated by the varying condition. De-energization of the load followed the reverse operation of the stepping switch. As a result, those loads coupled to the first few contacts of the stepping switch were in use substantially longer than loads further along in the sequence.

U.S Pat. No. 3,529,173 illustrates a concept in which the loads are energized in timed sequence in an attempt to equalize the energization time of the loads. While this system is somewhat effective in distributing the demand over the available loads, it requires manual advancement of a rotary switch and thus the equilization of the demand on the various loads becomes dependent upon human judgment, often resulting in improper sequencing of the loads.

SUMMARY OF THE INVENTION

It is an object of this invention to provide an improved control system for varying loads in response to a change in an environmental variable in which the loads are energized and de-energized on a first-on, first-off basis.

It is another object of this invention to provide an improved control system for varying loads which automatically distributes the demand sequentially over all of the available loads without preference to any of the loads.

It is another object of this invention to provide an inexpensive, solid-state control for distributing over a plurality of loads, a demand caused by a change in an environmental variable.

Basically the invention employs means for sensing a change in an environmental variable, a plurality of loads for changing the environmental variable, and sequencing means responsive to said sensing means for automatically selectively energizing and de-energizing said loads on a first-on, first-off basis. In the preferred form two solid state shift registers are respectively energized by increases and decreases in the sensed change of the environmental variable from a set norm with the outputs from the shift registers being progressively or sequentially coupled to a series of gates which are operative to energize and de-energize a series of loads. Increases in demand shift a pulse through the first shift register to energize the loads sequentially whereas decreases in the variable shifts a pulse throught the other shift register to de-energize the loads in the same order as they were energized in the first shifts register.

The environmental variable can be pressure, temperature, humidity, etc. Correspondingly, the loads can be generators, air conditioning units, heating elements, pumps, etc.

BRIEF DESCRIPTION OF THE FIGURES OF THE DRAWING

FIGS. 1A, 1B, 1C, and 1D are a combined schematic circuit diagram of the preferred embodiment of the invention.

DESCRIPTION OF THE PREFERRED EMBODIMENTS

Figure 1:
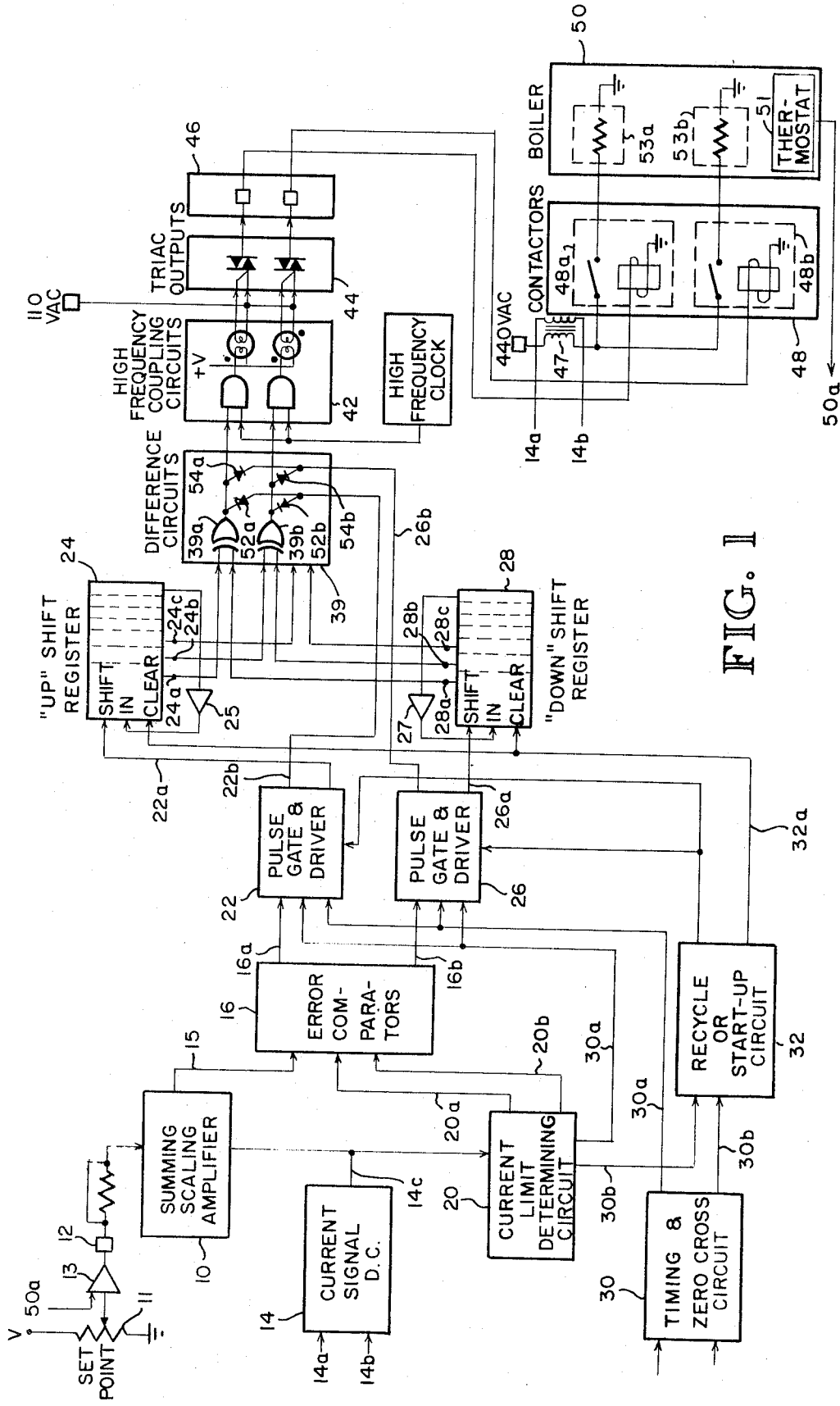
FIG. 1 is an operational block diagram of a preferred embodiment of the invention.

The preferred embodiment of the invention will be described herein with reference to a boiler control system where the environmental variable is the boiler temperature and the loads are a series of electrical heating coils. Referring now to FIG. 1, the desired boiler temperature is established by some type of automatically or manually established set point such as potentiometer 11. The output of the set point potentiometer 11 is a voltage indicative of the desired boiler temperature.

The actual boiler temperature is derived from a thermostat 51 located at some appropriate point within the boiler. The voltage output from thermostat 51 is indicative of the present temperature of the boiler under control and is fed to some type of comparator such as differential amplifier 13. The other input to differential amplifier 13 is the voltage signal from the set point potentiometer 11 so that the output of amplifier 13 is a signal indicative of the difference between the desired temperature and the actual boiler temperature.

For the purposes of the present explanation it will suffice to say that the boiler temperature will generally be at some level below the desired temperature so that the voltage output of the differential amplifier 13 will represent the need for some quantity of additional power to the boiler. This voltage signal is then proportional to temperature error and as such indicates the amount of power which must be supplied to the boiler.

Figure 1A:
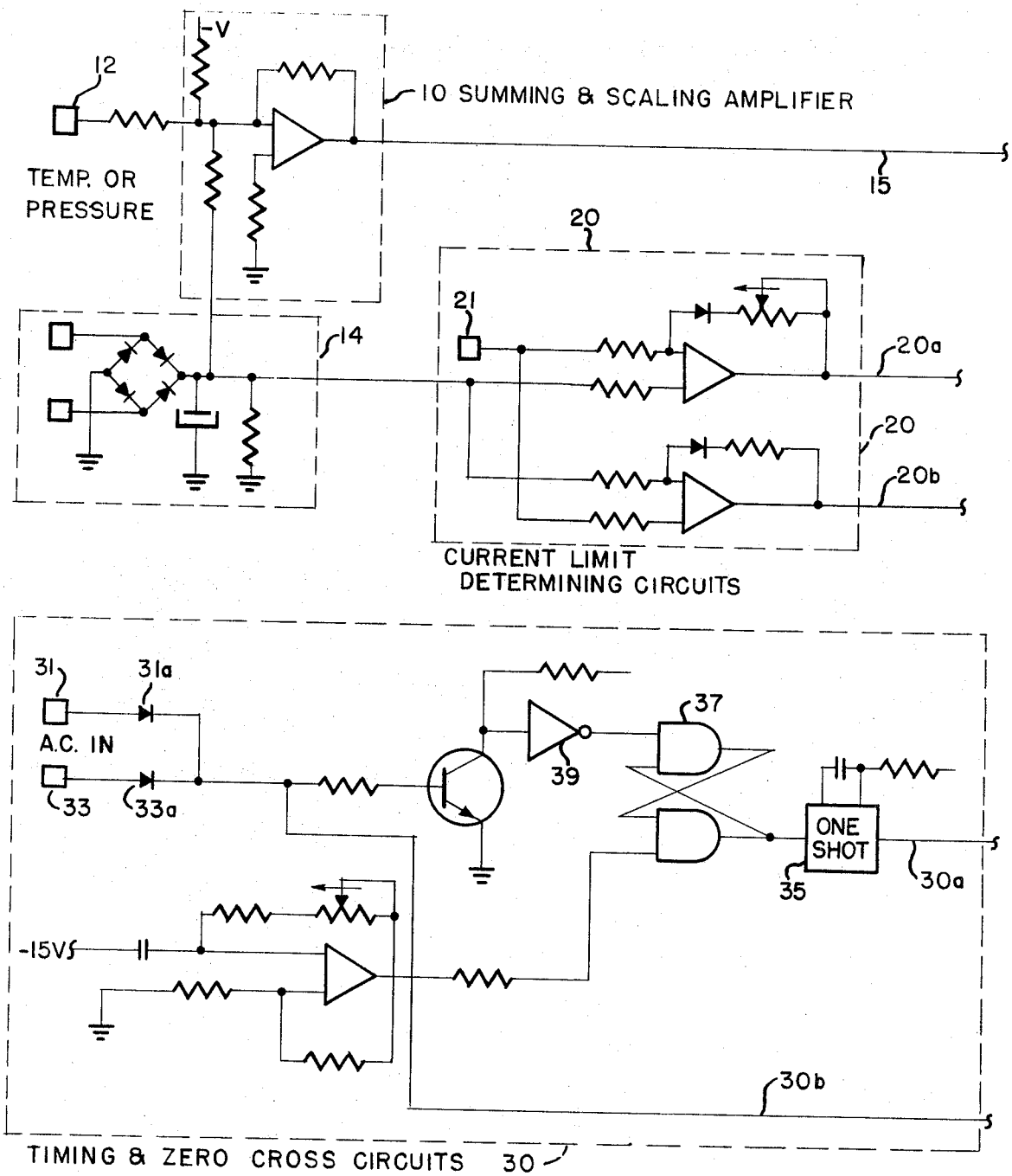

The actual power input to the boiler is sensed in some fashion such as a current transformer 47 located in the main power lines feeding the heating coils in the boiler. The signal from current transformer 47 will be an A.C. voltage porportional to the present power being fed to the boiler. This voltage is fed to a D.C. current signal circuit 14 (shown in detail in FIG. 1A) where it is converted to a D.C. voltage proportional to present power consumption.

The required amount of power is thus indicated by the output of amplifier 13. This signal is fed to a summing and scaling amplifier 10. The other input to summing and scaling amplifier 10 is the output of the current sensing circuit 14 which is proportional to the actual power being supplied to the boiler. Thus, the amplifier 10 operates to determine whether more or less power input to the boiler is required. This signal is fed via line 15 to the error comparators 16.

Figure 1B:
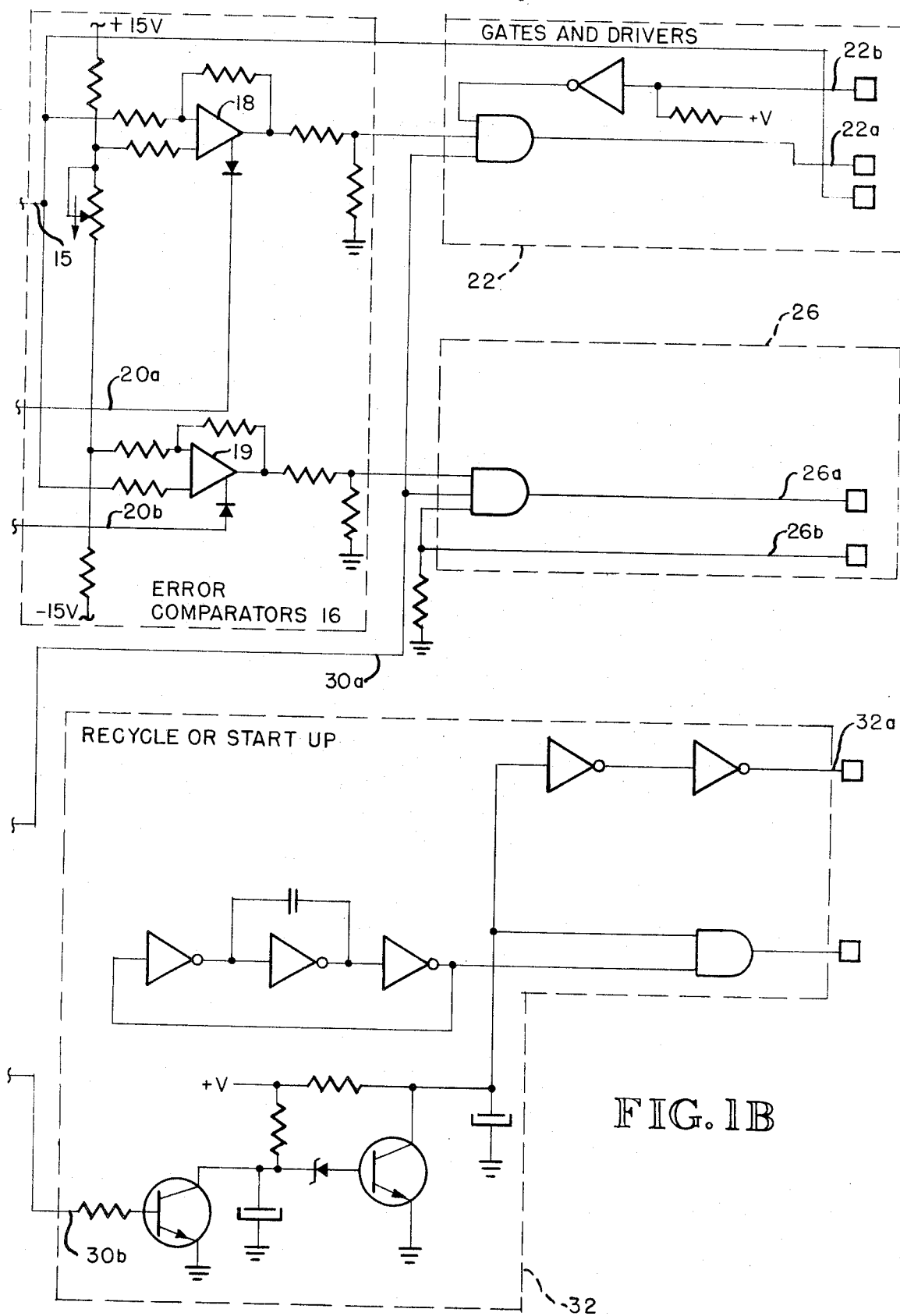
Figure 1D:
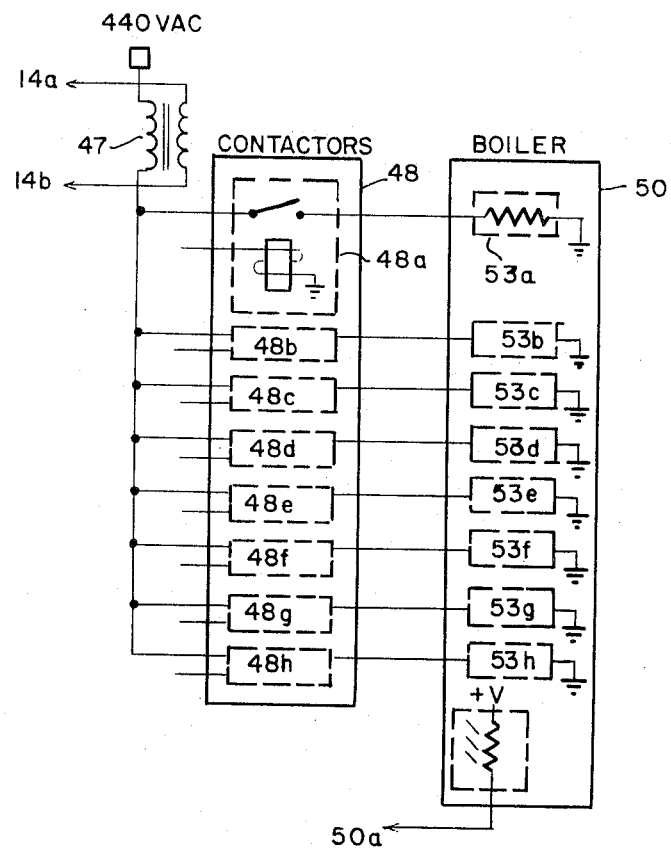

The error comparator circuit 16 is shown in detail in FIG. 1B. For the present it suffices to say that error comparator 16 functions to examine the output of amplifier 10. If this output indicates that more power to the boiler is required there will be a signal on output line 16a. If less power is needed then there will be a signal on output line 16b.

The two output signals from error comparator circuit 16 are fed to two pulse gate and driver circuits 22, 26 which are shown in detail in FIG. 1B. Briefly, pulse gate and driver 22 is connected to error comparator 16 via line 16a. When there is an output present on line 16a, pulse gate and driver circuit 22 operates to generate a pulse of the appropriate duration and at the appropriate time in the sequence. The timing function is accomplished by virtue of a connection via line 30a to a timing and zero cross circuit 30 which will be explained in greater detail hereinafter.

Similarly, pulse gate and driver circuit 26 is connected to output line 16b of the error comparator 16. Pulse gate and driver circuit 26 operates to generate an appropriate pulse when there is a signal present on output line 16b.

The output of pulse gate and driver circuit 22 is connected via line 22a to the shift input terminal of a shift register 24. Shift register 24 may be constructed in several fashions and in the preferred embodiment it is connected to form a twisted ring register. For the purposes of explanation it will be assumed that there are three input terminals, IN, SHIFT, and CLEAR. The shift register 24 has a plurality of sections (eight as shown for simplicity). There is an output terminal associated with each section. As is well known, a pulse on the SHIFT input will shift the logic signal present at the IN terminal to the first section and shift the contents of all sections to the next adjacent section. Thus, if there is a logic one (or "high") on the IN terminal, a pulse on the SHIFT terminal will "set" the first stage of the register and cause its output to assume a logic one (or "high") level. The IN terminal of shift register 24 is connected to the output of an inverter 25. The input to inverter 25 is connected to the output of the final stage of shift register 24 to form a twisted ring register. Assume that all stages of the register begin in the reset or clear state. The output of the final stage is thus a logic zero (or "low") so that the output of inverter 25 is a logic one. The first pulse on the SHIFT terminal "sets" the first stage of the register by shifting the logic one on the IN terminal into that stage. The next pulse on the SHIFT terminal shifts the logic one from the first stage of the register to the second stage and shifts the logic one from the IN terminal to the first stage. Operation continues in this fashion until all eight stages are in the set state.

When the last section of the shift register 24 assumes the set state its output becomes a logic one, changing the output of inverter 25 to a logic zero. Since there is now a logic zero on the IN terminal the next pulse on the SHIFT terminal causes the first stage to reset. Operation continues in this fashion until all stages are reset. In summary then it can be seen that shift register 24 reacts to a series of pulses on the SHIFT input terminal by successively setting the stages of the register until all are set and then successively resetting all stages until all are reset and so forth. Finally, the CLEAR input terminal operates to automatically clear or reset all stages of the register regardless of their present state.

A second shift register 28 has its SHIFT input terminal connected to pulse gate and driver circuit 26 via line 26a and its IN terminal connected to the output of inverter 27. It is identical in construction and operation to shift register 24 as explained above.

The stages of the shift registers 24, 28 are individually connected to difference circuits 39. That is, the first stage of shift register 24 and the first stage of shift register 28 are both connected to a first difference circuit composed of an exclusive OR gate 39a. Similarly the second stages of both are connected to a second difference circuit composed of exclusive OR gate 39b. It is the unique connection of the two shift registers 24, 28 to these exclusive OR gates that enables the present invention to sequentially activate the heating elements and then de-energize them on a first-on first-off basis.

The functions of the two shift registers 24, 28 and the difference circuits 39 is readily apparent when one recalls the logic operation of an exclusive OR gate. That is, if either input is at a predetermined logic level (logic one, "high" or whatever) then its output assumes that logic level. If, however, both inputs are at that logic level (logic one) then the output assumes the opposite logic level (logic zero). Similarly, if neither input is at logic one or high, then the output is at logic zero (or low).

Before showing in detail precisely how the present invention operates to sequentially activate the heating elements on a first-on first-off basis, the remainder of the block diagram leading to activation of the heating elements in the boiler 50 will be briefly explained. Each difference circuit is connected to a high frequency coupling circuit 42 to individually activate an associated triac. The triacs 44 in turn energize contactors 48 which individually supply power to the heating elements 53a in the boiler 50. For simplicity it suffices to say that an output from one of the difference circuits 39 will ultimately result in energization of its associated heating element, there being one heating element associated with each difference circuit.

Figure 2:
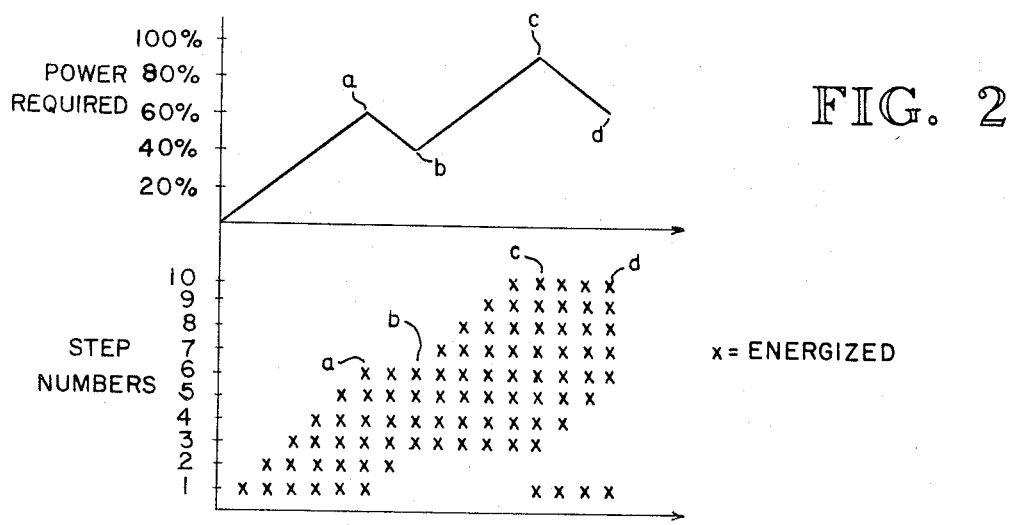
FIG. 2 is a diagrammatic chart illustrating the resulting progressive sequential operation of the preferred embodiment.

Referring in combination then to FIG. 1 and FIG. 2 the operation of the control system of the present invention will be explained in somewhat greater detail. The upper portion of FIG. 2 shows a hypothetical example of POWER REQUIRED for an exemplary operating cycle of the boiler being controlled. The power requirement beings at zero and rises steadily to a 60 percent power requirement at point a. Assume that there are ten heating elements in the boiler under control so that each is capable of supplying 10 percent of the total power capabilities of the boiler.

When the power requirement reaches 10 percent the input signal to error comparator 16 will rise to a level such that there will be an output on line 16a indicating the need to increase power input by 10 percent (or one step of the control system). This results in an appropriately timed pulse being generated by pulse gate and driver circuit 22. This pulse is relayed via line 22a to the SHIFT input terminal of shift register 24. Assuming that all stages of both shift registers begin in the reset state, the first stage of shift register 24 will set generating a logic one (or "High") on output terminal 24a. Output terminal 24a is connected to exclusive OR gate 39a along with output terminal 28a from shift register 28. Since only one of the inputs to exclusive OR gate 39a is at logic one, its output will assume the logic one state and this ultimately results in the energization of the first heating element 53a thus supplying the required 10 percent power to the boiler.

Assume now that the power requirement continues to rise to 20 percent. At this point the sequence repeats itself to the extent of a pulse being generated by pulse gate and driver circuit 22. When this pulse is fed to shift register 24, the second stage thereof assumes the set state and ultimately energizes the second heating element 53b via exclusive OR gate 39b and its associated coupling circuit, triac, and contactor. Continuing in this fashion as power requirements rise to 60 percent it can be seen that the first six heating elements will be sequentially energized by the time the 60 percent power requirement at point a is reached.

At this point in the cycle power requirements begin to decline until only 40 percent of power is required at point b. Prior art control systems would handle the decrease to 40 percent by de-energizing the last two heating elements activated (i.e. steps 5 and 6). The result of this conventional approach is to maximize use (and therefore wear) on the contractors and heating elements associated with the initial steps and unevenly distribute the load between the elements. The present invention, however, handles this decrease in power requirements by de-energizing the first heating element previously energized, i.e. step one.

This unique and important feature of the present invention is accomplished as follows. When power requirement declines from 60 percent to 50 percent the output of summing and scaling amplifier 10 reverses polarity to indicate to the error comparator circuit 16 that a decrease in power is required. The result is an output signal on line 16b which in turn results in a pulse from pulse gate and driver circuit 26. This pulse is relayed via line 26a to the SHIFT input terminal of shift register 28 so that the first stage of shift register 28 assumes the set state. At this point the first stages of both shift registers 24, 28 are in the set state so that both inputs to exclusive OR gate 39a are now at logic one. Under these circumstances the output of gate 39a reverts to logic zero which ultimately de-energizes the first heating element 53a. Similarly, as the required power drops to 40 percent, a second pulse is generated by pulse gate and driver circuit 26. This sets the second stage of shift register 28 and de-energizes the second heating element.

The remainder of FIG. 2 is self-explanatory as power requirement increases to 90 percent at point c and then decreases again to 60 percent at point d. Note that the power requirement at both points a and d is 60 percent. At point a, that requirement is supplied by energization of steps 1-6 in the boiler control. At point d this same requirement is supplied by step 1 and steps 6-10. This unique capability of the present invention as explained above results from equalization of the load by the first-on, first-off feature of operation.

The foreqoing represents the principle features of the operational aspects of the present invention. Other important features are, however, included. Note first the current limit determining circuit 20. The current limiting circuit 20 is a further unique and important feature of this invention. The current limiting circuit 20 operates to compare a signal from some internal or external current limit adjustment with the D.C. signal from the current feedback circuit 14. When the feedback current approaches the predetermined limit the current limiting circuit overrides the error comparator and forces the signal on output 16a to the off state. This prevents further increase of power since no further pulses can be generated by pulse gate and driver 22 so that shift register 24 cannot advance. When the feedback current exceeds the limit, the current limiting circuit 20 sends a signal forcing the signal on output line 16 b of the error comparator 16 to the ON state. That causes a reduction in power since pulses from pulse and gate driver 26 operate to advance shift register 28 and deenergize heating elements. Thus within its initial range of operation, the current limiting circuit merely stops further increases in power. Should excessive power generation occur, the current limiting circuit automatically counteracts the excessive power by reducing the number of energized loads.

Another important feature of this invention is the recycle or start-up circuit 32 shown in detail in FIG. 1B. Basically, this circuit presets the shift registers 24 and 28 to a known state when power is applied after power has been temporarily interrupted. The recycle circuit 32 senses an interruption in power and, if the interruption is greater than, for example, 5 cycles the shift registers are automatically cleared. This is accomplished by generating an output signal on line 32a which is connected to the CLEAR input terminal of shift registers 24, 28. When power is restored, the shift registers are energized at a slow, controlled rate until power is restored to the required level existing prior to the interruption.

FIGS. 1A–1D are somewhat more detailed schematic diagrams of the elements shown in the block diagram of FIG. 1. Conventional symbols are used throughout these schematic diagrams and the actual circuits themselves can be readily understood by reference to these schematic diagrams. A few brief explanatory comments are appropriate however.

Current limit determining circuit 20 has an unlabeled input 21 which is adapted to receive an external input signal indicative of a predetermined load limit. The upper portion of this circuit operates to prevent further increase in power and the lower half to institute reduction in power when the load limit indicated at input terminal 21 has been reached.

The timing and zero cross circuit 30 is used to control the timing of pulses generated by the pulse gate and driver circuits 22, 26. In this fashion energization and de-energization of heating elements is appropriately timed in respect to the A.C. input. The A.C. input is fed to terminals 31, 33 and constitutes two 60 hz. A.C. signals, 180 degrees out of phase. These A.C. signals are then single wave rectified by diodes 31a, 33a so as to produce what is essentially full wave rectified, unfiltered D.C. Since this signal goes to zero volts each time the input A.C. crosses zero it can ultimately be used to trigger a one-shot circuit 35 to generate pules of a desired width at each zero cross.

In order to avoid erroneous attempts to increase or decrease power when the system is at full power or zero power there are diode AND gates 52, 54 connected to the outputs of the exclusive OR gates 39 as shown in FIG. 1C. If all heating elements are energized there will be an output from each of the exclusive OR gates 39a–39h. A diode AND gate composed of diodes 52a–52h senses this condition and feeds an appropriate signal via line 22b to prevent further pulses from being generated by the pulse gate and driver circuit 22.

Similarly, if none of the heating elements are energized there will be no output signal from any of the exclusive OR gates 39a–39h. This condition is detected by a second diode AND gate composed of diodes 54a–54h which operate to generate a signal via line 24b to inhibit the operation of pulse gate and driver 26. The remaining logic and circuit diagrams are self-explanatory. In the preferred embodiment NAND gates are used as exemplified by the logic element with reference numeral 37 in FIB. 1A. Inverters are represented as indicated by the logic element in FIG. 1A bearing reference numeral 39. It will of course be understood that any type of logic system, positive or negative, could suffice equally well in performing the functions described with respect to the preferred embodiment.

While the preferred embodiment of the invention has been illustrated and described, it should be obvious that modifications and altneratives will become apparent one skilled in the art without departing from the principles of the invention. For example, by the simple addition of additional "up" and "down" shift registers, the number of steps or loads brought into the first-on first-off operation can be increased. Accordingly, the invention is not to be limited to the particular form described, but rather only by the literal interpretation of the claims appended hereto.

The embodiments of the invention in which an exclusive property or privilege is claimed are defined as follows:

1. A control for varying loads in response to a change in an environmental variable comprising:
   means for sensing a change in the environmental variable;
   a plurality of loads for changing the environmental variable, and
   progressive sequencing means responsive to said sensing means for automatically selectively energizing and de-energizing said loads in the following order: the load energized the longest since it was last energized of the plurality of loads energized at any particular instant is the first to be de-energized and the load de-energized the longest since it was last de-energized of the plurality of loads de-energized at any particular instant is the first to be re-energized; whereby the energization period of the loads will be substantially equally distributed among all the loads to the maximum extent as demanded by the environmental variable.

2. The control of claim 1, said progressive sequencing means including a down-shift register and an upshift register each operative to advance a pulse along output terminals thereof in direct response to a respective increase or decrease in the value of the environmental variable, gate means responsive to pulses from said upshift register for sequentially energizing successive loads and responsive to corresponding pulses from said down-shift register to sequentially de-energize said successive loads whereby the loads will be de-energized in the same order as they were energized.

3. The control of claim 2, said gate means including a series of exclusive OR-gates, each having inputs coupled respectively to one of a plurality of outputs of each shift register, the outputs of said shift registers being sequentially coupled to successive exclusive OR-gates so that advancement of pulses through said shift registers results in successive energization and de-energization of said exclusive OR-gates.

4. The control of claim 1 further comprising:
   power sensing means for sensing the actual power being delivered to said plurality of loads,
   limit establishing means for setting a predetermined power limit, and
   limit determining means operatively connected to said power sensing means and said limit establishing means, said limit determining means being operative to compare the actual power being delivered with the predetermined power limit and prevent energization of additional loads when the actual power being delivered approaches the predetermined power limit.

* * * * *